United States Patent
Marton et al.

(10) Patent No.: US 7,315,619 B2
(45) Date of Patent: Jan. 1, 2008

(54) SYSTEM AND METHOD FOR ENHANCED SUBJECTIVE STEREO AUDIO

(75) Inventors: Trygve Frederik Marton, Oslo (NO); Bjorn Winsvold, Tranby (NO); Tore Gravermoen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 338 days.

(21) Appl. No.: 11/023,586

(22) Filed: Dec. 29, 2004

(65) Prior Publication Data

US 2005/0169459 A1    Aug. 4, 2005

(30) Foreign Application Priority Data

Dec. 29, 2003   (NO) ................. 20035841

(51) Int. Cl.
*H04M 1/00* (2006.01)
(52) U.S. Cl. ............... 379/406.11; 379/406.08; 379/406.14; 381/71.7
(58) Field of Classification Search ........... 379/406.08, 379/406.11, 406.14; 381/71.7
See application file for complete search history.

(56) References Cited

U.S. PATENT DOCUMENTS

| | | | |
|---|---|---|---|
| 4,629,829 A | 12/1986 | Puhl et al. | |
| 4,751,730 A | 6/1988 | Galand et al. | |
| 4,792,915 A | 12/1988 | Adams et al. | |
| 5,113,389 A | 5/1992 | Cox | |
| 5,657,384 A | 8/1997 | Staudacher et al. | |
| 6,442,272 B1 | 8/2002 | Osovets | |
| 6,556,682 B1 | 4/2003 | Gilloire et al. | |
| 6,931,123 B1 | 8/2005 | Hughes | |
| 6,950,513 B2* | 9/2005 | Hirai et al. | 379/406.11 |
| 2004/0174991 A1* | 9/2004 | Hirai et al. | 379/406.08 |

FOREIGN PATENT DOCUMENTS

SE    512 903    6/2000

OTHER PUBLICATIONS

Akira Nakagawa, et al., "Channel-number-compressed multi-channel acoustic echo canceller for high-presence teleconferencing system with large display", Acoustics, Speech, and Signal Proceeding, 2000 ICASSP '00. Proceedings. 2000 IEEE International Conference., vol. 2, Jun. 6-9, 2000, pp. 813-816.

Jacob Benesty, et al. "Synthesized Stereo Combined with Acoustic Echo Cancellation for Desktop Conferencing", Bell Labs Technical Journal, Jul.-Sep. 1998, pp. 148-158.

* cited by examiner

*Primary Examiner*—Jefferey Harold
(74) *Attorney, Agent, or Firm*—Oblon, Spivak, McClelland, Maier & Neustadt, P.C.

(57) ABSTRACT

The present invention relates to an audio communication system and method with improved acoustic characteristics. The present invention utilizes the Haas effect to simulate a sound picture that gives a better subjective impression of stereo sound compared to the objective stereo image. It provides a system and a method for presenting the stereo image in an optimal way for an associated echo canceller without compromising with the subjective perception of stereo.

14 Claims, 5 Drawing Sheets

SYSTEM AND METHOD FOR ENHANCED SUBJECTIVE STEREO AUDIO

FIELD OF THE INVENTION

The present invention relates to an audio communication system and method with improved acoustic characteristics, and particularly to a conferencing system having an improved stereo audio echo cancellation performance.

BACKGROUND OF THE INVENTION

In a conventional conferencing system set-up that uses loudspeakers, two or more communication units are placed at separate sites. A signal transmitted from one site to another site using a conference system experiences several delays, these delays will include a transmission delay and a processing delay. For a video conferencing system, the processing delay for video signals is considerably larger than the processing delay for the audio signals. Because the video and audio signals have to be presented simultaneously, in phase, a lip sync delay is purposefully introduced to the audio signal, in both the transmitting and receiving signal paths in order to compensate for the longer video signal delay.

In a conventional conferencing system, one or more microphones captures a sound wave at a site A, and transforms the sound wave into a first audio signal. The first audio signal is transmitted to a site B, where a television set or an amplifier and loudspeaker, reproduces the original sound wave by converting the first audio signal generated at site A into the sound wave. The produced sound wave at site B, is captured partially by the audio capturing system at site B, converted to a second audio signal, and transmitted back to the system at site A. This problem of having a sound wave captured at one site, transmitted to another site, and then transmitted back to the initial site is referred to as acoustic echo. In its most severe manifestation, the acoustic echo might cause feedback sound, when the loop gain exceeds unity. The acoustic echo also causes the participants at both site A and site B to hear themselves, making a conversation over the conferencing system difficult, particularly if there are delays in the system set-up, as is common in video conferencing systems, especially due to the above mentioned lip sync delay. The acoustic echo problem is usually solved using an acoustic echo canceller, described below.

FIG. 1 is an overall view of a video conferencing system. This system is distributed at two sites, A and B. As for the conferencing system set-up, a video conferencing module can be distributed at more than two sites and also the system set-up is functional when only one site has a loudspeaker. The video module has at site A a video capturing system 1141 that captures a video image and a video subsystem 1150 that encodes the video image. In parallel, a sound wave is captured by an audio capturing system 1111 and an audio subsystem 1130 encodes the sound wave to the acoustic signal. Due to processing delays in the video encoding system, the control system 1160 introduces additional delays to the audio signal by use of a lip sync delay 1163 so to achieve synchronization between the video and audio signals. The video and audio signals are mixed together in a multiplexer 1161 and the resulting signal, the audio-video signal is sent over the transmission channel 1300 to site B. Additional lipsync delay 1262 is inserted at site B. Further, the audio signal presented by the audio presenting device 1221 is materialized as a sound wave at site B. Part of the sound wave presented at site B arrives to the audio capturing device 1211 either as a direct sound wave or as a reflected sound wave. Capturing the sound at site B and transmitting this sound back to site A together with the associated delays forms the echo. All delays described sums up to be considerable and therefore the quality requirements for an echo canceller in the video conferencing system are particularly high.

FIG. 2 shows an example of an acoustic echo canceller subsystem, which may be a part of the audio system in the video conferencing system of FIG. 1. At least one of the participant sites has the acoustic echo canceller subsystem in order to reduce the echo in the communication system. The acoustic echo canceller subsystem 2100 is a full band model of a digital acoustic echo canceller. A full band model processes a complete audio band (e.g., up to 20 kHz; for video conferencing the band is typically up to 7 kHz, in audio conferencing the band is up to 3.4 kHz) of the audio signals directly.

As already mentioned, compensation of acoustic echo is normally achieved by an acoustic echo canceller. The acoustic echo canceller is a stand-alone device or an integrated part in the case of the communication system. The acoustic echo canceller transforms the acoustic signal transmitted from site A to site B, for example, using a linear/non-linear mathematical model and then subtracts the mathematically modulated acoustic signal from the acoustic signal transmitted from site B to site A. In more detail, referring for example to the acoustic echo canceller subsystem 2100 at site B, the acoustic echo canceller passes the first acoustic signal 2131 from site A through the mathematical modeller of the acoustic system 2121, calculates an estimate 2133 of the echo signal, subtracts the estimated echo signal from the second audio signal 2132 captured at site B, and transmits back the second audio signal 2135, less the estimated echo to site A. The echo canceller subsystem of FIG. 2 also includes an estimation error, i.e., a difference between the estimated echo and the actual echo, to update or adapt the mathematical model according to changes of the environment, at a position where the sound is captured by the audio capturing device.

The model of the acoustic system 2121 used in most echo cancellers is a FIR (Finite Impulse Response) filter, approximating the transfer function of the direct sound and most of the reflections in the room. A full-band model of the acoustic system 2121 is relatively complex and processing power requiring, and alternatives to full-band, dividing the frequency band into several sub-bands, are normally preferred.

The core component in an echo cancellator is the already mentioned acoustic model (most commonly implemented by a FIR filter). The acoustic model attempts to imitate the transfer function of the far end signal from the loudspeaker to the microphone. This adaptive model is updated by gradient search algorithm. The algorithm tries to minimize an error function, which is the power of the signal after the echo estimate is subtracted. For a mono echo canceller, this solution works, it is a uniform and unique solution.

However, in high quality communications, it is often desirable to transmit and present high quality multi channel audio, e.g. stereo audio. Stereo audio includes audio signals from two separate channels representing different spatial audio from a certain sound composition. Loading the channels on each respective loudspeaker creates a more faithful audio reproduction, as the listeners will perceive a spatial difference between the audio sources from which the sound composition is created.

The signal that is played on one loudspeaker differs from the signal presented on the other loudspeaker(s). Thus, for a stereo (or multi channel) echo canceller, the transfer function from each respective speaker to the microphone needs to be compensated for. This is a somewhat different situation compared to mono audio echo cancellation, as there are two different but correlated signals to compensate for.

In addition, the correlation in the different channels tends to be significant. This causes the normal gradient search algorithms to suffer. Mathematically expressed, the correlation introduces several false minimum solutions to the error function. This is i.a. described in Steven L. Gat and Jacob Benesty "*Acoustic signal processing for telecommunication*", Boston: Kluwer Academic Publishers, 2000. The fundamental problem is that when multiple channels carry linearly related signals, the solution of the normal function corresponding to the error function solved by the adaptive algorithm is singular. This implies that there is no unique solution to the equation, but an infinite number of solutions, and it can be shown that all but the true one depend on the impulse responses of the transmission room (in this context, the transmission room may also include a synthesized transmission room as e.g. recorded or programmed material played back at the far-end side). The gradient search algorithm may then be trapped in a minimum that not necessarily is the true minimum solution.

Another common way of expressing this stereo echo canceller adaptation problem is that it is difficult to distinguish between a room response change and an audio "movement" in the stereo image. For example, the acoustic model has to reconverge if one talker starts speaking at a different location at the far end side. There is no adaptive algorithm that can track such a change sufficiently fast, and a mono echo canceller in the multi-channel case does not result in satisfactory performance.

One common approach to solve the uniqueness problem, is to add a decorrelation device in the loudspeaker audio signal path. While solving the uniqueness problem, this introduces unwanted distortion of the audio.

Another approach is to solve the echo canceller with a hybrid mono/stereo echo canceller, which is based on the fact that even stereo signals or material has two equal signals, i.e. are mono, in major part of the time.

A variant of a hybrid mono/stereo echo canceller approaching this problem is shown in FIG. 3. The system models the sum of L and R, i.e. the mono response. Further, the system is provided with a stereo detector, i.a. causing the model of acoustic signal to suspend converging when stereo is detected. The stereo contribution of the echo will then not converge the model to a false solution, and a satisfactory suppression of the mono echo is maintained even if stereo is present. The non-linear processing unit, present in most acoustic echo cancellers, is modified to remove/attenuate the stereo echo signal, as well as the residual mono echo signal. When solving the stereo echo situation with a hybrid stereo/mono echo canceller as described above, the performance is increasing when reducing the objective stereo level of the far-end signal. However, it is not desirable to reduce the subjective perception of stereo. If a canceller is based completely upon a mono compensator, the stereo image echo must be considered as a residual echo, and handled by the nonlinear processing unit.

It is therefore an object of the present invention to reduce the objective perception stereo without reducing the subjective perception for achieving a better effect of hybrid mono/stereo echo cancelling systems.

SUMMARY OF THE INVENTION

In particular, the present invention discloses an audio echo canceller system adjusted to provide an echo attenuated output signal from an echo added input signal including near-end audio in addition to an echo contribution originating from a far-end audio presenter unit receiving a left (L) and a right (R) audio signal, wherein the far-end audio presenter unit includes a first adder configured to add L and R creating a non-delayed mono signal, a delay unit configured to delay said non-delayed mono signal with a predefined time creating a delayed mono signal being loaded into a centre loudspeaker, and a left and a right loudspeaker into which a first and a second L and R deduced signal respectively are loaded. The invention also provides a method corresponding to the system.

BRIEF DESCRIPTION OF THE DRAWINGS

In order to make the invention more readily understandable, the discussion that follows will refer to the accompanying drawings.

BEST MODE OF CARRYING OUT THE INVENTION

In the following, the present invention will be discussed by describing a preferred embodiment, and by referring to the accompanying drawings. However, even if the specific embodiment is described in connection with video conferencing, a person skilled in the art will realize other applications and modifications within the scope of the invention as defined in the enclosed independent claim.

The present invention is based on the so-called Haas-effect well known in the art of acoustics. The Haas effect is also known as the precedence effect, and describes the human psychoacoustic phenomena of correctly identifying the direction of a sound source heard in both ears but arriving at different times. Due to the head's geometry (two ears spaced apart, separated by a barrier) the direct sound from any source first enters the ear closest to the source, then the ear farthest away. The Haas Effect describes how humans localize a sound source based upon the first arriving sound, if the subsequent arrivals are delayed less than 25-35 milliseconds depending on the audio level. If the later arrivals are longer than this, then two distinct sounds are heard. The Haas Effect applies even when the second arrival is louder than the first (even by levels as great as 10 dB.)

The present invention utilizes this effect to simulate a sound picture that gives a better subjective impression of stereo sound compared with the objective stereo image. It provides a system and a method for presenting the stereo image in an optimal way for an associated echo canceller without compromising with the subjective perception of stereo.

Figure 1:
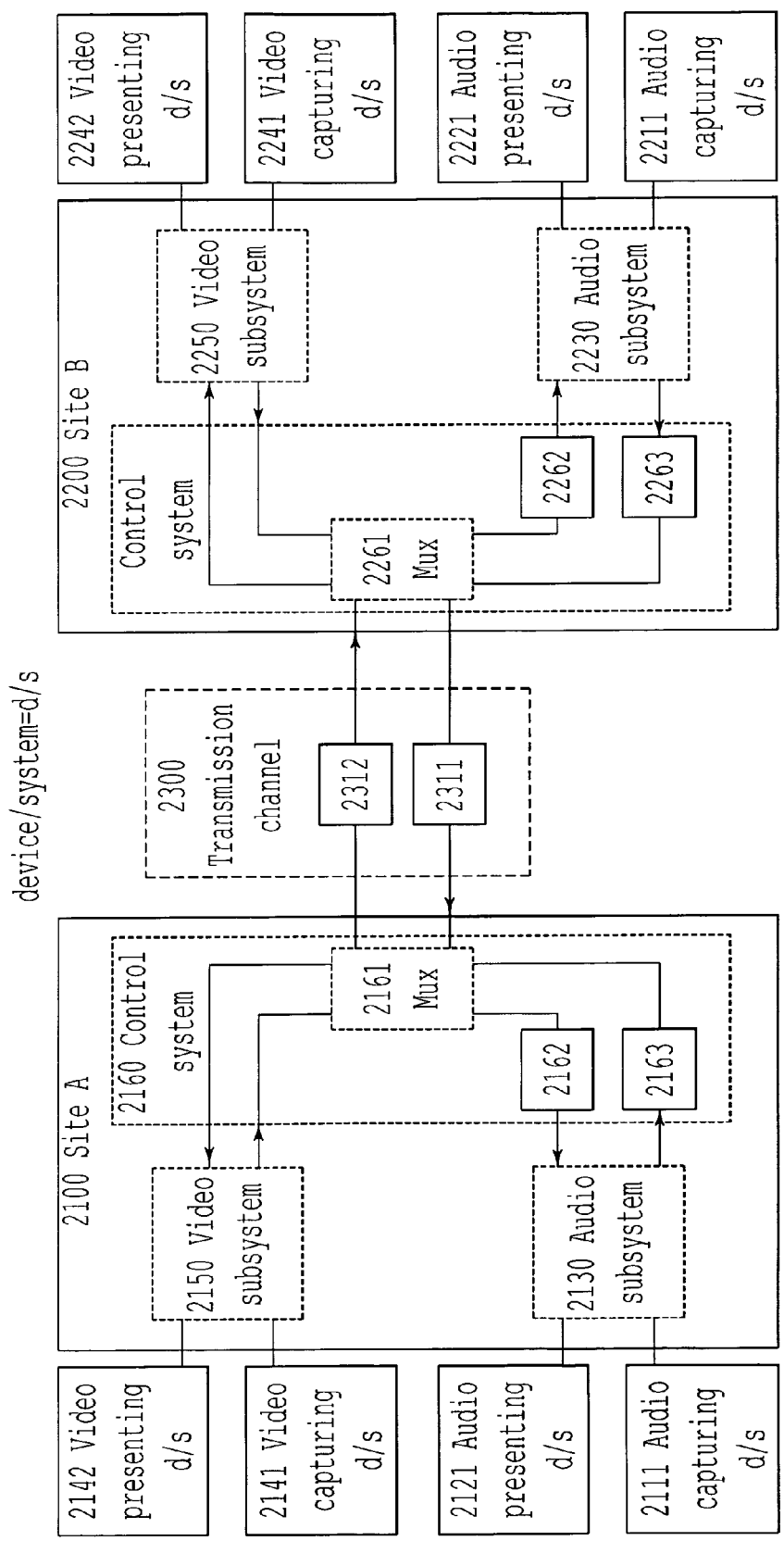
FIG. 1 is a detailed block diagram of a conventional conferencing system set-up.
Figure 2:
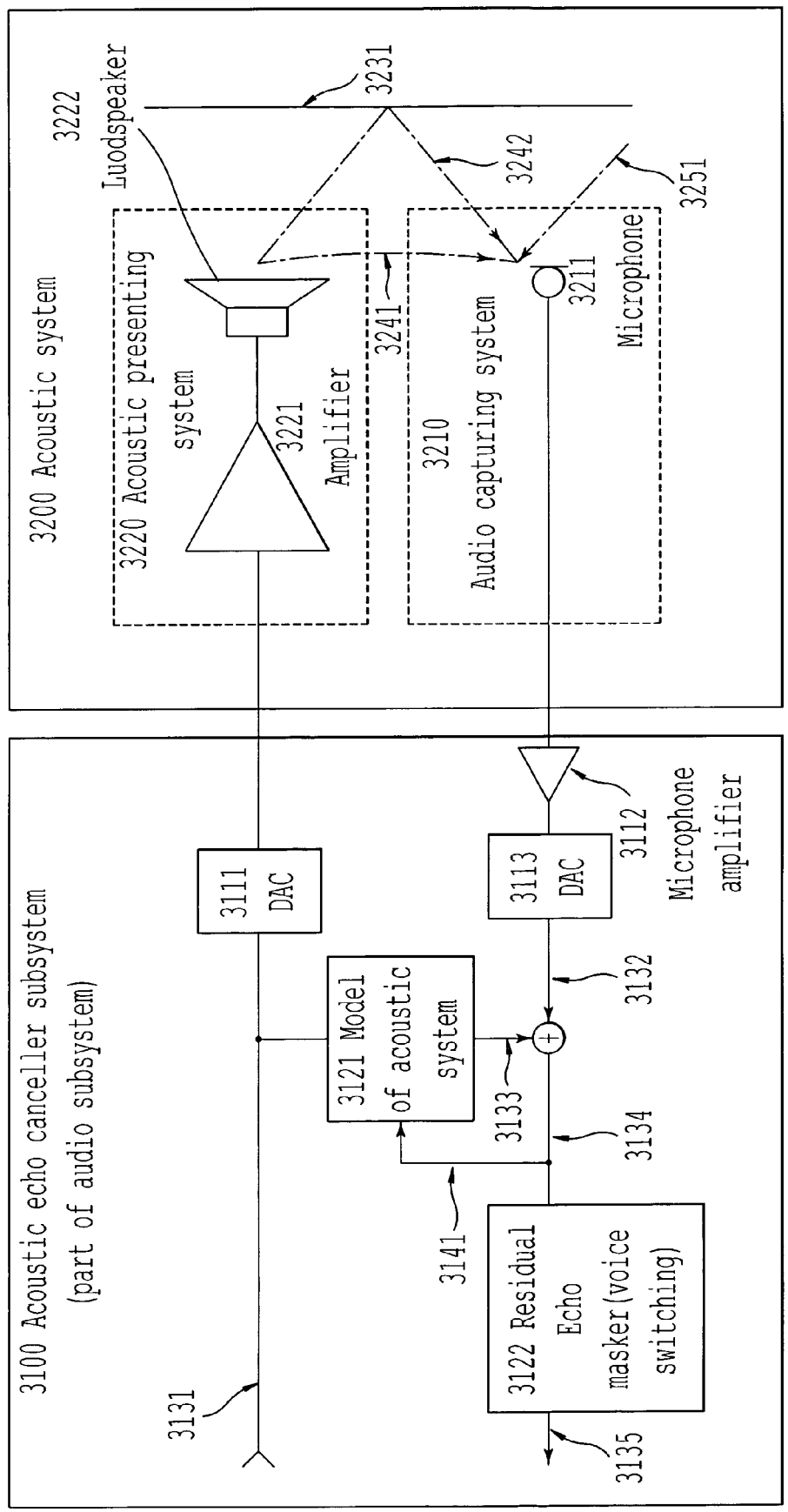
FIG. 2 is a closer view of an acoustic echo canceller subsystem.
Figure 3:
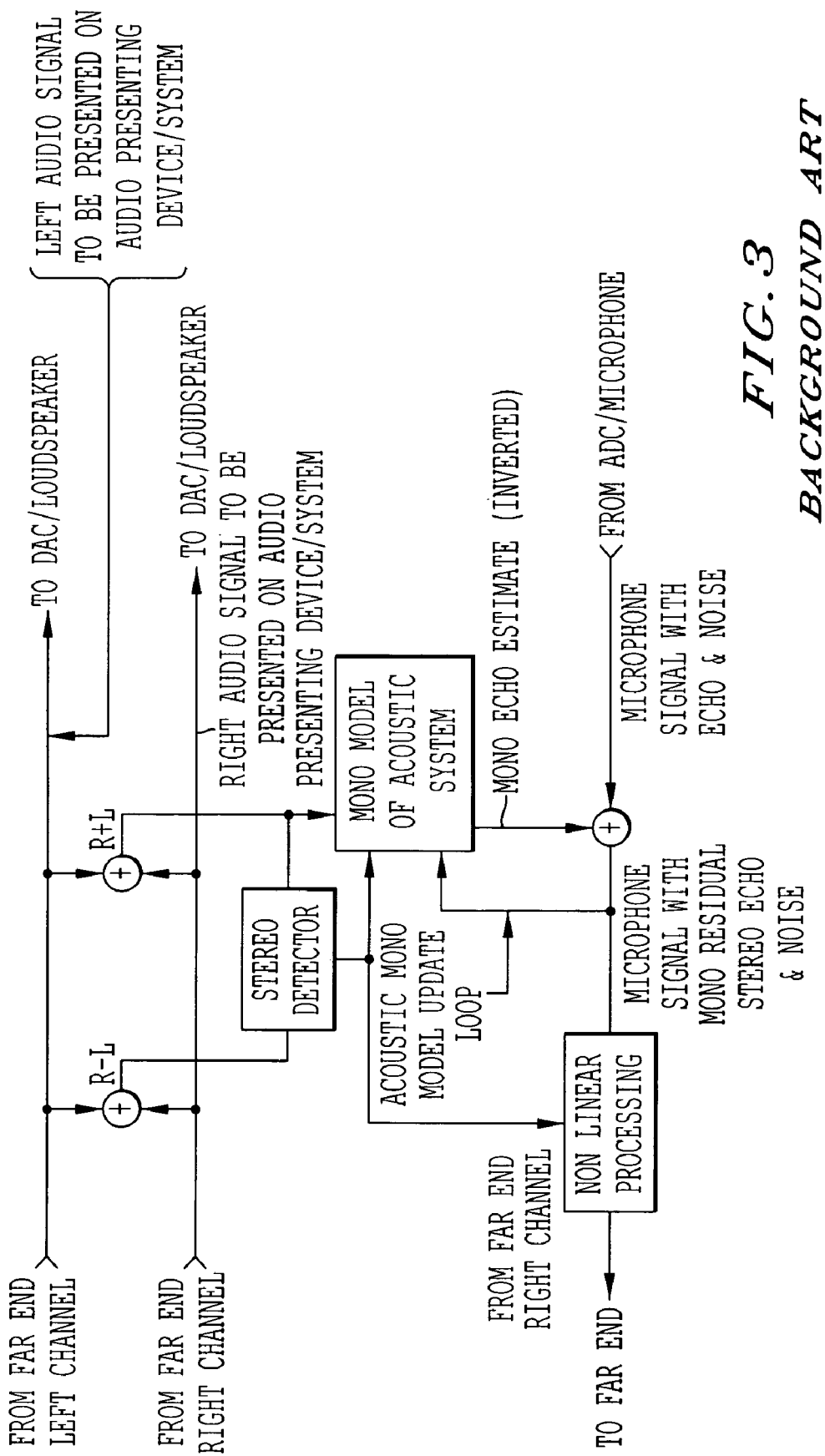
FIG. 3 is a block diagram of an example of a stereo audio echo canceller system.
Figure 4:
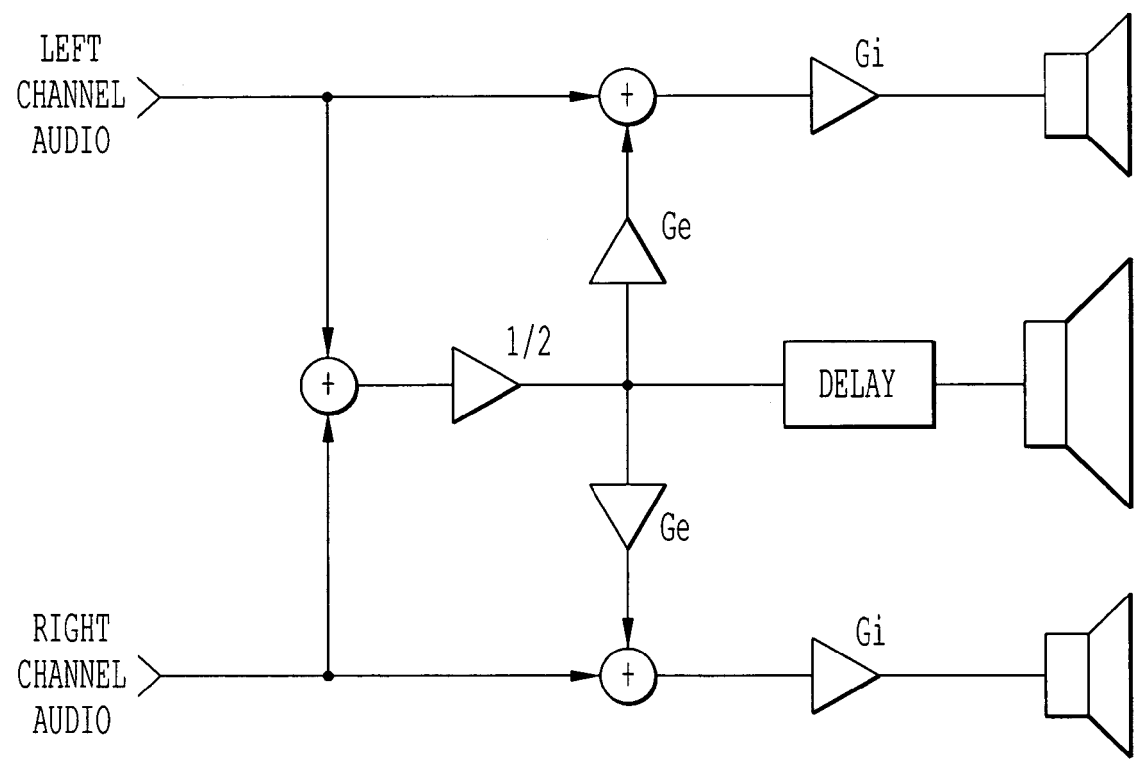
FIG. 4 is a far-end audio presenter unit according to a first embodiment of the present invention.

FIG. 4 shows an audio presentation system according to one embodiment of the present invention. The left and right signals are summed and multiplied by ½ (to obtain the correct level), creating a mono signal. The mono signal is delayed and thereafter played on a centre speaker. The mono signal is multiplied with a stereo enhancement gain $g_e$ and subtracted from the right and left signals, respectively. The subtracted signals are attenuated, by multiplying with the stereo image gain $g_i$, and thereafter played on a right and left (satellite) speaker.

The selection of the gain $g_i$ and the centre delay is critical to the result. For best echo canceller performance, $g_i$ should be selected as low as possible. Experience has shown that a stereo enhancement gain $g_e$ of 0, time delays in the area of 5-10 ms and $g_i$ of −12 dB maintains the stereo perception.

The stereo enhancement gain $g_e$ enlarges the stereo image, by removing parts of the mono/sum signal from the satellite speakers. This technique, although slightly differently presented, is known from three dimensional audio presentation techniques. The modified signals on the left and right satellite speakers are, respectively:

$$L'=(L*(1-g_e/2)-R*(g_e/2))*g_i$$

$$R'=(R*(1-g_e/2)-L*(g_e/2))*g_i$$

The enhancement gain can be selected in the range 0 to 1.0 is no enhancement, and the original left and right signals are played unmodified on the left and right satellite speaker, respectively. 1 is full enhancement, resulting in that a mono signal will imply no audio played on the satellite speakers.

As can be seen from the expressions above, the two gains $g_e$ and $g_i$ are not independent. If the enhancement gain is increased above 0, the image gain needs to be increased to maintain the same objective audio level on the satellite speaker. However, as the stereo image is enlarged, this is not necessarily true for maintaining the subjective perception of stereo. Thus, the objective stereo image level can be further reduced using the enhancement gain.

Figure 5:
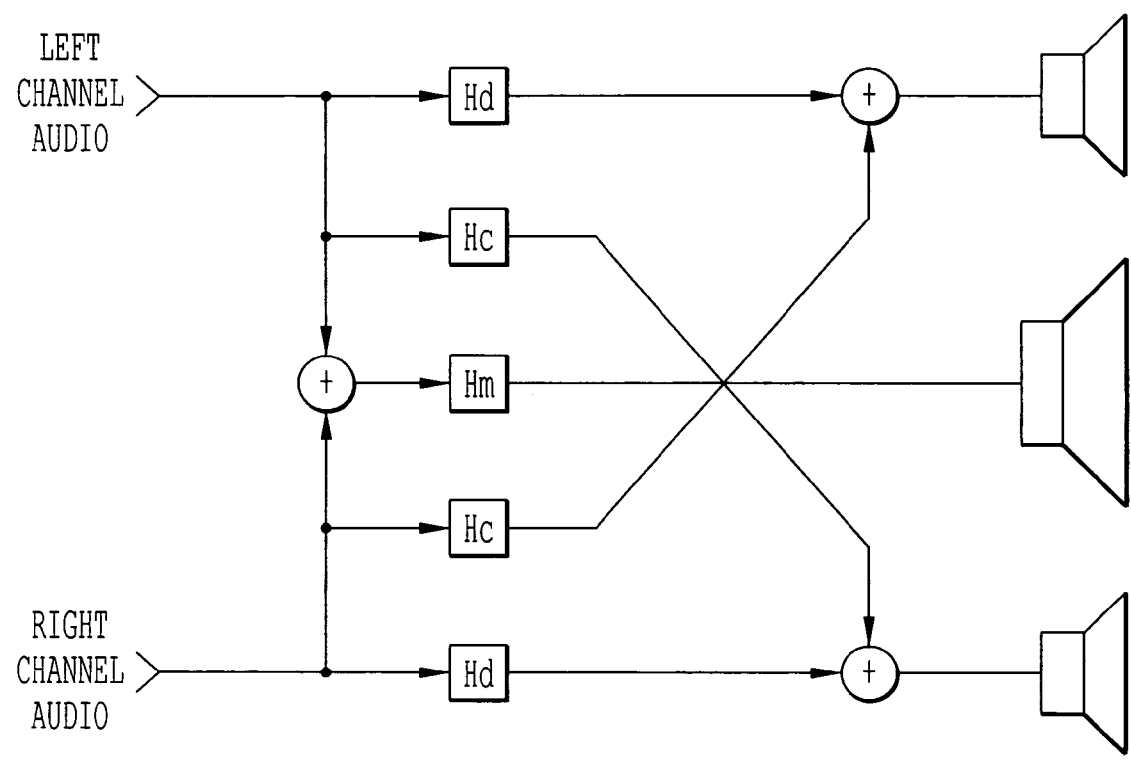
FIG. 5 is a far-end audio presenter unit according to a second embodiment of the present invention.

FIG. 5 shows a generalized version of the system.

The left and right channel are summed, and filtered with the filter $H_m$. Compared to FIG. 4, this filter incorporates both the multiplication by ½ and the delay.

The left and right channels are both filtered with the direct filter $H_d$, and summed with the opposite signal filtered with the crossover filter $H_c$. Compared to FIG. 7, the combination of $H_d$ and $H_c$ constitutes the enhancement gain and image gain.

By using more general filters, further improvement/stereo echo reduction can be obtained. The enhancement gain, the image gain and the delay can be individually optimized for the different frequencies. In addition, it is possible to deliberately remove all stereo information in frequency bands that contributes little to the human stereo perception, while maintaining the stereo information in the other frequency bands.

The present invention reduces the overall objective stereo image level while maintaining the subjective perception of stereo. It therefore reduces the disadvantages introduced by using a hybrid mono/stereo echo canceller algorithm for stereo echo control. The stereo image echo can be treated as residual echo, using familiar nonlinear processing algorithms present in almost every high quality acoustic echo canceller, as the stereo image echo is objectively lowered to a level comparable to residual echo.

The invention further reduces the required audio level on the satellite speakers, therefore smaller, more inexpensive speakers, easier to fit into the system, can be used.

The invention claimed is:

1. An audio echo canceller system adjusted to provide an echo attenuated output signal from an echo added input signal including near-end audio in addition to an echo contribution originating from a far-end audio presenter unit receiving a left (L) and a right (R) audio signal, wherein the echo attenuated output signal is generated by attenuating the echo in the echo added input signal by a linear adaptive filter, the far-end audio presenter unit comprising:
a first adder configured to add L and R creating a non-delayed mono signal,
a delay unit configured to delay said non-delayed mono signal with a predefined time creating a delayed mono signal being loaded into one or more main loudspeakers, and
one or more left and one or more right loudspeakers into which a first and a second L or R deduced signal, respectively, are loaded,
wherein said non-delayed mono-signal is used as a reference signal for the linear adaptive filter.

2. The audio echo canceller system according to claim 1, wherein said delay unit is integrated in a first filter ($H_m$) following said first adder.

3. The audio echo canceller system according to claim 2, further comprising:
a second adder configured to add R filtered by a second filter ($H_c$) with L filtered by a third filter ($H_d$) to create said first L or R deduced signal, and
a third adder configured to add L filtered by said second filter ($H_c$) with R filtered by said third filter ($H_d$) creating said second L or R deduced signal.

4. The audio echo canceller system according to claim 1, further comprising an attenuator, following said first adder, configured to multiply first adder output with ½ to form said non-delayed mono signal.

5. The audio echo canceller system according to claim 1 or 4, wherein the first and second L or R deduced signal are multiplied with a first gain $G_i$, respectively, before being loaded into said one or more left and one or more right loudspeakers.

6. The audio echo canceller system according to claim 5, wherein the first L or R deduced signal is L, and the second L or R deduced signal is R.

7. The audio echo canceller system according to claim 5, further comprising:
a first subtractor, creating the first L or R deduced signal, configured to subtract said non-delayed mono signal multiplied with a second gain $G_e$ from L, and
a second subtractor, creating the second L or R deduced signal, configured to subtract said non-delayed mono signal multiplied with the second gain $G_e$ from R.

8. A method in an audio echo canceller system providing an echo attenuated output signal from an echo added input signal including near-end audio in addition to an echo contribution originating from a far-end audio presenter unit receiving a left (L) and a right (R) audio signal, comprising:
attenuating the echo in the echo added input signal by using a linear adaptive filter;
adding L and R to create a non-delayed mono signal,
delaying said non-delayed mono signal with a predefined time to create a delayed mono signal being loaded into a one or more main loudspeakers,
respectively loading a first and a second L or R deduced signal into one or more left and one or more right loudspeakers, and
using said non-delayed mono signal as a reference signal for the linear adaptive filter.

9. The method according to claim 8, wherein said step of delaying is carried out in a first filter ($H_m$).

10. The method according to claim 8 or 9, further comprising:
adding R filtered by a second filter ($H_c$) with L filtered by a third filter ($H_d$) to create said first L or R deduced signal, and adding L filtered by said second filter ($H_c$) with R filtered by said third filter ($H_d$) to create said second L or R deduced signal.

11. The method according to claim 8, wherein the step of adding L and R to create a non-delayed mono signal further includes attenuating the result with ½ to form said non-delayed mono signal.

12. The method according to claim 8 or 11, further comprising:
respectively multiplying the first and second L or R deduced signal with a first gain $G_i$ before being loaded into said one or more left and one or more right loudspeakers.

13. A method according to claim 12, wherein the first L or R deduced signal is L, and the second L or R deduced signal is R.

14. The method according to claim 12, further comprising:
subtracting said non-delayed mono signal multiplied with a second gain $G_e$ from L, to create the first L or R deduced signal, subtracting said non-delayed mono signal multiplied with the second gain $G_e$ from R, to create the second L or R deduced signal.

* * * * *